June 7, 1938.  L. C. BRISSON ET AL  2,119,903
SHOE BRAKE
Filed Feb. 11, 1936  2 Sheets-Sheet 1
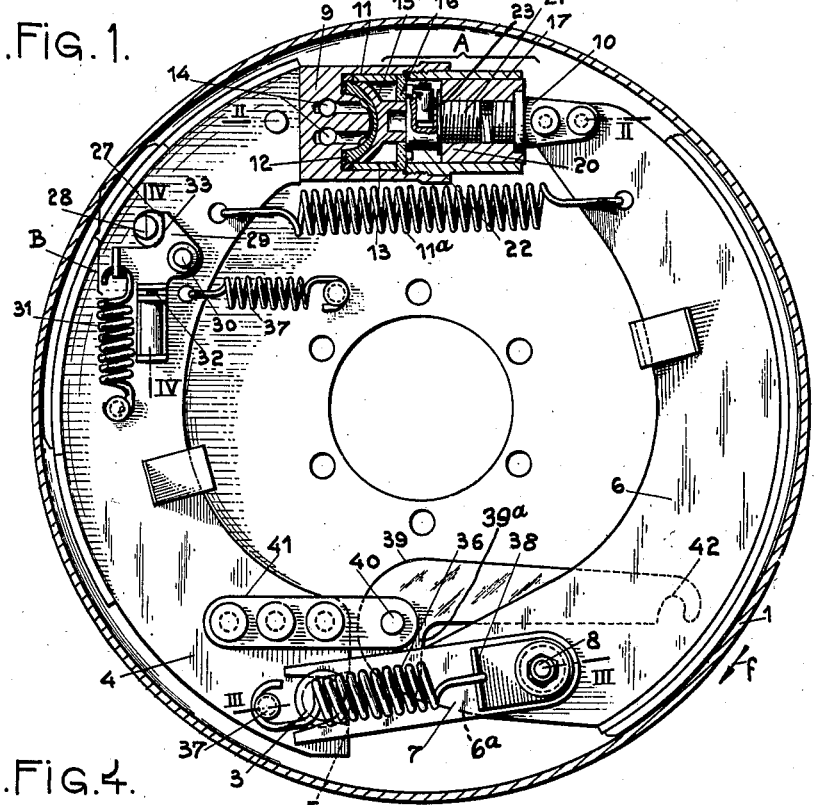
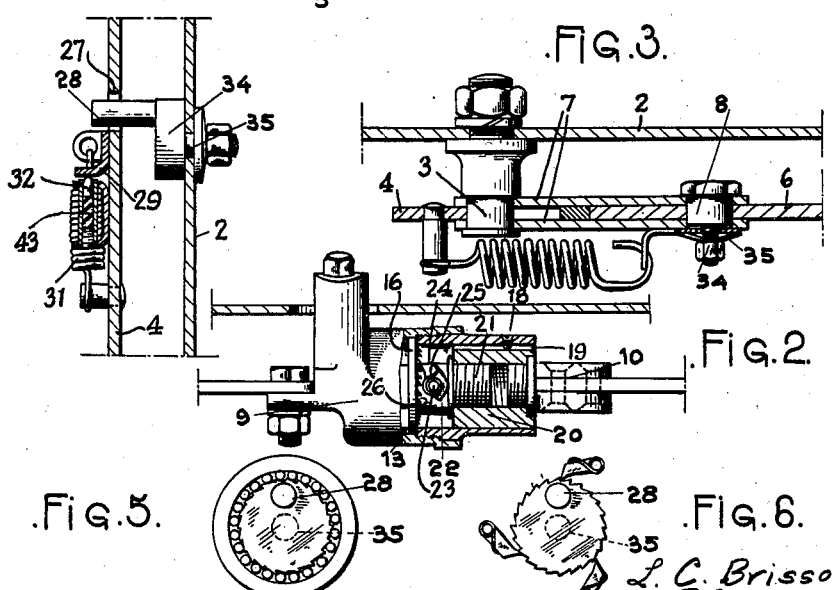
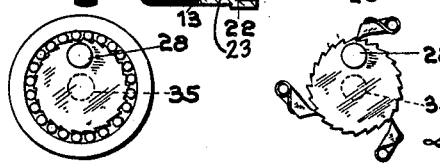

June 7, 1938.  L. C. BRISSON ET AL  2,119,903
SHOE BRAKE
Filed Feb. 11, 1936  2 Sheets-Sheet 2
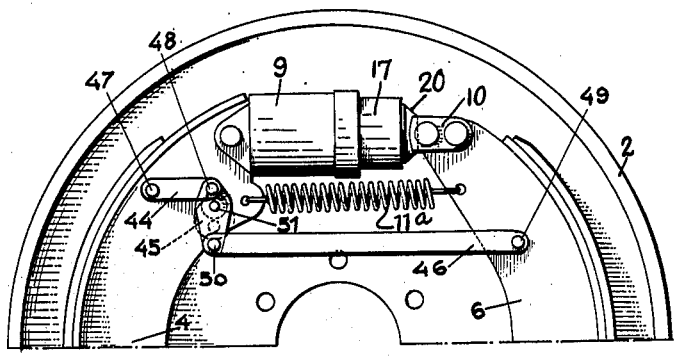
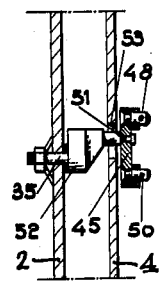
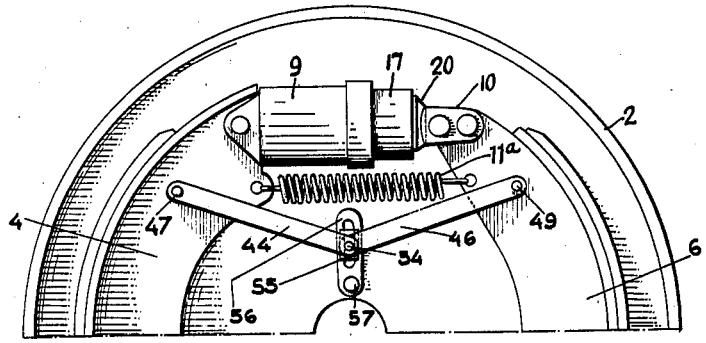

Patented June 7, 1938

2,119,903

UNITED STATES PATENT OFFICE 2,119,903

SHOE BRAKE

Louis Charles Brisson, Neuilly-sur-Seine, and Pierre Marmignon, Le Pré-Saint-Gervais, France, assignors to Société Anonyme: Société des Freins Hydrauliques S. de Lavaud, Paris, France Application February 11, 1936, Serial No. 63,458
In France June 3, 1935

3 Claims. (Cl. 188—79.5)

The invention relates to shoe brakes which comprise a brake drum, a fixed member having abutment surfaces, two brake shoes each pressing against one of said abutment surfaces through one of their ends, resilient means adapted to move the other ends of the brake shoes towards each other, and means for moving these latter ends away from each other when it is desired to produce a braking action.

In brakes of this type already known, the said spacing means are floatably supported in a fixed member.

A first object of the invention is to simplify the construction of these brakes, to reduce their price and to render the operation of the same more positive; for that purpose, the spacing means are supported by one of the brake shoes, instead of being floatably supported in a fixed member as was known.

A second object of the invention is to ensure, in an improved brake as just stated, the automatic taking up of the wear.

A third object of the invention is to ensure, in an improved brake as just mentioned, the brake shoes being held in a correctly centered position.

A fourth object of the invention is to avoid the inconveniences which occur when the brake drum expands and contracts under the effect of the variations of temperature.

Other objects of the invention will further appear from the description of some forms of construction, with reference to the accompanying drawings, in which:

Fig. 1 is an elevation, with parts in section.

Fig. 2 is a section made according to line II—II of Fig. 1.

Fig. 3 is a section made according to line III—III of Fig. 1.

Fig. 4 is a section made according to line IV—IV of Fig. 1.

Figs. 5 and 6 are views of one way devices.

Fig. 7 is a partial elevation of a second form of construction.

Fig. 8 is a side view.

Fig. 9 is a partial elevation of a third form of construction.

In the example illustrated in Fig. 1, the drum 1 rotates, during forward running, in the direction of the arrow *f*.

On the plate 2 is fitted a cylindrical abutment 3 on which the brake shoe 4 directly bears, this brake shoe being provided for that purpose with a notch at 5. The brake shoe 6 bears against the abutment 3 through the medium of a link 7 frictionally pivoted at 8 on the brake shoe 6. In this form of construction, the receiver is of the hydraulic type, but this constitutes only an example. The body 9 of this receiver is secured to the brake shoe 4, and its piston acts upon the end 10 of brake shoe 6. A tension spring 11$^a$ acts between both brake shoes.

The hydraulic receiver does not present in itself any feature which is not already well known and, therefore, it will be but briefly described.

The body 9 is bored at 11 for receiving a rubber cap 12, held by a ring 13 and adapted to swell under the action of a hydraulic pressure produced by the actuation of the control member, and admitted through one of the channels 14, the other channel serving for the evacuation of air upon filling up of the pipe line. The cap 12 acts on a piston 15 guided in the ring 13 and in the bore of a fixed toothed crown wheel 16 held at the same time as the ring 13 by the screw threaded cylinder 17 which is secured in the body 9. In this cylinder 17 slides, without rotating (owing to a claw 18 entering a rectilinear slot 19 Fig. 2) a piston 20 which constitutes the nut of an irreversible screw 21, which is provided with a head 22 bearing against the crown 16. In the head 22 is fitted the pivot pin 23 of a pawl 24, which, by a spring 25, is moved in engagement with teeth 26 formed on the fixed crown 16. The operation is very simple: for a braking stroke not exceeding the height of the tooth with which the pawl 24 is in engagement, the device for taking up the play does not fulfill any function. For a greater stroke, the pawl 24 passes to the adjacent tooth and, upon return to the position of rest, this pawl causes screw 21 to rotate, this ensuring the taking up of the play. The braking stroke is therefore always smaller than a certain limit value, determined by construction.

One of the shoes, for instance shoe 4, is perforated at 27 with a hole into which enters an abutment 28 provided on the brake plate 2. The hole 27 has a larger diameter than that of abutment 28, and a lever 29 is pivoted at 30, but is held by a spring 31, in contact with an abutment 32 which, for the moment, will be assumed to be fixed.

The abutment 28 is therefore engaged, with a certain play, which corresponds to about one half the braking stroke determined as stated above, between the wall of hole 27 and the face 33 of lever 29. The abutment 28 is eccentrically arranged on a plate 34 pivoted, at 35, with a suitable friction, on the brake plate 2. This friction must be sufficient in order that, when the entire device is at rest, the spring 11$^a$ may press the shoe 4 against abutment 28 without causing the latter to move; the friction must however allow the displacement of abutment 28 under the action of the braking stress when, the braking stroke having exceeded the play or clearance between 27, 28 and 33, the face 33 of lever 29 presses against abutment 28 and causes the latter to rotate about 35. In these conditions, the shoe 4 is always held at rest in a fixed and distinctly defined position relatively to the brake drum. But then, owing to the fact that the distance between the ends of shoes 4 and 6, separated by the hydraulic receiver, is constantly and automatically adjusted in order that the braking stroke should be constant, the position of shoe 6, at rest, is also perfectly determined relatively to the drum. The entire system is therefore correctly centered.

It is important to note the complete separation of the functions fulfilled, according to the invention, by the device for automatically taking up play, designated in the drawings by A, and the centering device designated in the drawing by B. Devices of the type of B are known, but were used up to now for a well defined purpose, which was to automatically ensure taking up of the play. Now, in the structure described, the device B ensures the fixity, at rest, of the relative position of shoe 4 relatively to the drum, but it is obvious that it could not ensure the relative fixity of the second shoe 6 relatively to the drum without the help of the device A for taking up the play.

Moreover, it will be noted that the device B cannot alone ensure centering, but only the combination of this device B with the device A.

The shoe 6 might directly bear upon an abutment reserved for it, or directly bear upon abutment 3. The link 7 is however preferably used in order to ensure a better contact of the brake lining with the drum, throughout the extent of this lining, which is that effecting, during forward running, the greater part of the braking action. This link 7 also serves to ensure the setting or orientation of the abutment reaction. The friction connection effected at 8 is obtained for instance by resilient clamping by means of a nut 34 and of a washer 35; it is adapted to prevent shoe 6, in the position of rest, from coming in contact with the drum, that is to say to ensure exact centering at rest.

A spring 36 stretched between a finger 37 of shoe 4 and the right angled member 38 fitted on the joint 8, is adapted to normally hold the end of shoe 4 and that of link 7 in contact with the fixed abutment 3, said shoe and said link bearing on this abutment through the medium of notches.

On the two wheels of at least one axle is provided, a second braking device, for instance a mechanical braking device.

In the example illustrated, the second braking device is a cam lever 39, pivoted at 40 on a member 41 rigid with the shoe 4. This lever is actuated at 42 by any suitable rigging. The drum 1 being assumed to rotate in the direction of the arrow f, braking by means of the lever 39 is obtained by causing the latter to rotate in a counterclockwise direction, as viewed in Fig. 1. By rotating about the pivot 40, the lever 39 presses through its end 39ᵃ against the end 6ᵃ of the brake shoe 6, this having for effect to space apart the adjacent ends of the brake shoes 4 and 6, in opposition to the action of spring 36. The brake shoes therefore come in contact with drum 1, and the friction tends to cause these brake shoes to rotate in the direction of the arrow f. The movement of the brake shoe 6 is stopped by the link 7 which presses against the abutment 3; this brake shoe being stopped, serves in its turn as a bearing, at 10, for the piston 20 and, consequently, for the brake shoe 4. If the drum rotated in reverse direction, the brake shoe 4 would directly bear upon the fixed abutment 3 and would serve as a bearing for the brake shoe 6.

In case the temperature rises, for instance owing to a long and powerful braking action, the drum expands. It is obvious that this expansion must not be compensated either by the play taking up device A or by the centering device B. In fact, if the play taking up device A acted in the case of expansions as in the case of wear, it would happen that, upon cooling, the drum would clamp as a hoop on the shoes. For avoiding this inconvenience, it obviously suffices that the idle stroke, automatically maintained by the play taking up device A should always be greater than the variations of the radius due to the expansions and contractions of the drum.

But a thermostatic device might also be provided, preventing the operation of the play taking up device during the periods of abnormal increase of temperature, as previously proposed by the applicants.

Concerning the centering device B, it is absolutely necessary that this device should not be responsive to the variations of radius due to the variations of temperature, as then centering in the cold state would not be correct. For that purpose, the abutment 32 is not fixed, but bears against an expansible body 43 such as vulcanized rubber, which increases or diminishes, according to the temperature, the play permitted relatively to the abutment 28.

Instead of being frictionally mounted, the stud 35 might be provided with a one way device, this free wheel allowing the abutment 28 to be moved towards the drum, but preventing it from being moved away therefrom. Any type of one way device can be employed, and particularly one way device of the propping ball or roller type, as shown in Fig. 5, and one way device of the pawl or differential pawl type as shown in Fig. 6.

In the examples illustrated in Figs. 7 to 9, the centering device is constituted in quite a different manner from that of the preceding example, and it is characterized by the fact that the shoes are connected to each other by a jointed system, without play, one of the elements of which is mounted on the fixed plate by means of a pivotal friction connection.

In the example of Figs. 7 and 8, the shoe 4 is connected to shoe 6 by a jointed system comprising: a link 44, a lever 45 and a second link 46; the link 44 is pivotally connected, at 47, to the shoe 4, and at 48, to the lever 45; the link 46 is pivotally connected, at 49, to the shoe 6, and at 50, to the lever 45.

The lever 45 is pivoted, at 51, on a support 52 secured on the plate 2 by a friction joint 35 similar to that previously described. The pivot pin 51 is eccentric relatively to the friction joint 35, and this pivot pin 51 passes through the cheek member of shoe 4 through a hole 53 of large diameter, in such a manner that the support 52 can rotate on its pivot pin 35, and that the shoe 4 can move, without however the support 52 and shoe 4 ever coming in contact.

The distances between the pivot pins 51 and 48 on the one hand, and 51 and 50, on the other hand, are suitably determined in order that, assuming the shoes 4 and 6 are correctly centered at rest, their movement to braking position causes only lever 45 to rotate about the pivot pin 51; but that, on the other hand, if one of the shoes comes in contact with the drum before the other, this causing either point 47, or point 49 to be held stationary, the subsequent displacement of the shoe, which is not yet in contact with the drum, determines a rotation of support 52 about the pivot pin 35.

In these conditions, it will be seen that the position of pivot pin 51 is automatically adjusted when the shoes are moved to braking position and that, owing to this automatic adjustment, the shoes are always correctly centered in the position of rest. In such a form of construction, it will be seen that it is not necessary, contrarily to what occurs in the preceding one, to provide a thermostatic adjusting device for the centering device.

In the example of Fig. 9, the links 44 and 46 connect points 47 and 49 to a pivot pin 54 carried by a slide-block 55 movable on a lever 56, frictionally pivoted at 57. If the system is assumed to be correctly centered at rest, the movement spreading the brake shoes 4 and 6 apart has for effect to open the angle between the links 44 and 46 with displacement of the slide-block 55 on the lever 56 which remains stationary. But, assuming one of the shoes comes in contact with the drum before the other, the displacement of the slide-block 55, under the effect of the movement of the other shoe, can take place only by causing the lever 56 to rotate on its friction pivot pin 57, which will ensure the automatic adjustment of the position of lever 56 and, consequently, centering when at rest.

Let us assume for instance that the lining of brake shoe 6 is worn to a greater extent than that of brake shoe 4. Consequently, upon braking, the brake shoe 4 will be the first to press against drum 1. Its movement will therefore be stopped, whereas the movement of brake shoe 6 continues. As the point 47 has become fixed, the link 44 rotates about this point during the movement spacing the brake shoe 6 away from the drum, this having necessarily for effect to cause lever 56 to rotate about the point 57. When the braking has ceased, all the members will have resumed their position, except lever 56 which will have rotated to a slight extent in a clockwise direction. Consequently, the brake shoe 4, the lining of which was the least worn, will have slightly moved towards the right and away from the drum, whilst the brake shoe 6, the lining of which was the most worn, will also have moved towards the right but towards the drum. It will therefore be seen that the rotation of lever 56 will have re-established a correct centering of the brake shoes within the drum.

What we claim as our invention and desire to secure by Letters Patent is:—

1. In a brake for a vehicle, a brake drum, a fixed member having stop surfaces, two brake shoes each pressed, at one of their ends, against one of said stop surfaces, resilient means arranged for moving the other ends of the brake shoes towards each other, spacing means operable while the vehicle is running supported by one at least of the shoes and arranged for cooperating with the other shoe, said spacing means comprising a device for taking up the wear, and means for automatically adjusting the distance between one at least of the shoes and the drum when the said shoe is in the position of rest.

2. In a brake for a vehicle, a brake drum, a fixed member having stop surfaces, two brake shoes each pressed, at one of their ends, against one of said stop surfaces, resilient means arranged for moving the other ends of the brake shoes towards each other, spacing means operable while the vehicle is running supported by one at least of the shoes and arranged for cooperating with the other shoe, said spacing means comprising a device for taking up the wear, a plate frictionally pivoted on the fixed member, a two-armed lever pivoted on said plate, the geometrical axis of pivoting of said lever being different from the geometrical axis of the pivotal connection of the plate to the fixed member, and two links pivotally connected to one of the shoes and to one of the arms of said lever, respectively.

3. In a brake for vehicles of the self-expanding type, a brake drum, a fixed member having stop surfaces, a first brake shoe arranged for bearing, by one of its ends, on one of said stop surfaces, spacing means operable while the vehicle is running, supported by the other end of said first brake shoe and comprising a device for taking up the play, a second brake shoe arranged for cooperating, by one of its ends, with said spacing means, a link frictionally and pivotally connected to the other end of said second brake shoe and arranged for bearing on another of said stop surfaces, resilient means for pressing against said stop surfaces one of the ends of the first brake shoe and the end of the link, another resilient means for moving towards each other the other ends of the brake shoes, and means for automatically adjusting the distance between one at least of the shoes and the drum when the said shoe is in the position of rest.

LOUIS CHARLES BRISSON.
PIERRE MARMIGNON.